United States Patent [19]

Takeuchi et al.

[11] Patent Number: 5,387,564
[45] Date of Patent: Feb. 7, 1995

[54] MOLDING AND CALCINING OF ZEOLITE POWDER

[75] Inventors: Tatsuro Takeuchi, Tsukuba; Motoya Mouri, Tsuchiura; Saji Okabayashi; Shoichi Miyamura, both of Kitakanbara, all of Japan

[73] Assignees: Takeda Chemical Industries, Ltd., Osaka; Mizusawa Industrial Chemicals, Ltd., Tokyo, both of Japan

[21] Appl. No.: 917,115

[22] PCT Filed: Sep. 13, 1991

[86] PCT No.: PCT/JP91/01226
§ 371 Date: Sep. 30, 1992
§ 102(e) Date: Sep. 30, 1992

[87] PCT Pub. No.: WO92/12104
PCT Pub. Date: Jul. 23, 1992

[30] Foreign Application Priority Data

Jan. 7, 1991 [JP] Japan .................................. 3-000272

[51] Int. Cl.$^6$ .............................................. B01J 29/04
[52] U.S. Cl. ...................................... 502/62; 501/128; 501/141; 501/153; 502/68; 264/176.1; 264/177.12; 264/211; 264/211.12; 264/211.2
[58] Field of Search ...................... 501/128, 141, 153; 502/62, 68; 264/176.1, 177.12, 211, 211.12, 211.2

[56] References Cited

U.S. PATENT DOCUMENTS 5,132,255 7/1992 Takeuchi et al. ...................... 501/94

FOREIGN PATENT DOCUMENTS 297942 1/1989 European Pat. Off. .
325425 7/1989 European Pat. Off. .

OTHER PUBLICATIONS

Weaver, Charles et al., "The Chemistry of Clay Minerals", pp. 1–2, (1973) no month.
Database WPIL Week 8637, Derwent Publications Ltd., London, AN 86-242417 (Aug. 1986).
*Chemical Abstracts,* vol. 115, No. 20, Abstract No. 213556r (Jun. 1991).
Supplementary European Search Report (Apr. 1993).

*Primary Examiner*—Anthony Green
*Attorney, Agent, or Firm*—Foley & Lardner

[57] ABSTRACT

A plastic or moldable composition of zeolite is obtained by adding 0.1–20 parts by weight of a $\beta$-1.3-glucan, 1:1 layer-type clay mineral and 2:1 layer-type clay mineral together with an adequate amount of water to 100 parts by weight of zeolite powder, and then kneading the resultant mixture. The composition may be, for example, extrusion-molded to a honeycomb structure, and calcined, to provide a calcined article of honeycomb structure of zeolite which has a high dimensional accuracy and strength, and hence is useful as a drying agent, a catalyst or a carrier material therefor. The calcined article of zeolite has an excellent mechanical strength.

25 Claims, No Drawings

MOLDING AND CALCINING OF ZEOLITE POWDER

DESCRIPTION

1. Technical Field

This invention relates to molding and calcining of zeolite powder. More particularly, the invention relates to a plastic and moldable composition of zeolite, a molded article and a calcined article of zeolite obtained by use of the composition, and a method of production of such a molded article and a calcined article of zeolite.

2. Background Art

A zeolite powder is usually formed to various shapes, for example, spherical, columnar, granular or honeycomb, and is used in various fields. As well known, zeolite powder has no plasticity, and a mixture with water provides no plastic material like a clay-water mixture. Accordingly, zeolite per se can not be plastic-molded or sintered.

It is already known that zeolite powder can be made plastic by mixing and kneading with an inorganic binder such as natural clay, bentonite, kaolin or colloidal silica, or an organic binder such as cellulose derivatives, and thus can be plastic-molded and calcined.

For instance, the use of crystalline cellulose as an organic binder is described in Japanese Patent/Application Laid-open No. 48-39399. There is also described in Japanese Patent/Application Laid- open No. 59-26923 and No. 2-6846 that zeolite powder is mixed with an inorganic binder such as natural clay, bentonite, kaolin or colloidal silica, or an organic binder such as cellulose derivatives, together with water, to provide an aqueous composition, and then the composition is molded, dried, and calcined to pellet-like calcined artcles.

However, the known method as above has disadvantages in that, for example, when natural clay is used as a plasticizing agent, it is necessary to use a comparatively large amount. Consequently, the resultant molded article contains a comparatively large amount of natural clay, and thus the resultant molded article is greatly affected in its properties as zeolites, such as adsorption power per unit weight, compared with zeolite powder itself. Also finely divided particles of clay may clog micropores of zeolite powder to further reduce adsorption power of zeolites.

There is also described a method of producing a calcined article of honeycomb structure in Japanese Patent Application Laid-open No. 61-171539. According to the method, a composition is prepared by admixing zeolite powder with an organic binder and inorganic fibers as a reinforcing material so that the resultant product has such a mechanical strength as is required in industrial use. The composition is molded, dried, and calcined while preventing the generation of cracks, to provide a calcined honeycomb article of zeolite powder. However, it has been found that the organic binder used fails to provide sufficient plasticity and moldability with the composition. In addition, the generation of cracks during the calcining is not sufficiently prevented.

It is further known that a kind of polysaccharide, pullulan, is used as a plasticizing agent when a powder of a ceramic material such as alumina is molded and calcined, as disclosed in Japanese Patent Application Laid-open No. 53-6309. The use of a natural polysaccharide including succinoglycan is also known in the production of molded and heat-treated article of powder of such a ceramic material as alumina or titanium oxide, as disclosed in Japanese Patent Application Laid-open No. 64-65066. As zeolite is useful as, for example, an adsorbent or a catalyst, however, no molding aid has hitherto been known which is effectively used through the steps of molding, drying and calcining zeolite powder to provide sufficient strength in the molded article.

The present inventors have made intensive investigations to solve such problems as above described involved in the conventional methods of plastic molding of zeolite powder, and found that the addition of a small amount of a $\beta$-1,3-glucan to the powder provides an aqueous plastic composition of zeolite powder. It has been further found that when a composition of zeolite comprising an inorganic sintering agent is molded, dried and calcined to produce a molded or calcined article of zeolite having an excellent strength and dimensional accuracy with no cracks being generated thereon.

It is, therefore, an object of the invention to provide a plastic or moldable composition of zeolite.

It is also an object of the invention to provide a molded or a calcined article of zeolite obtained by use of the composition.

It is a further object of the invention to provide a method of producing such a molded or a calcined article of zeolite as above.

DISCLOSURE OF THE INVENTION

In accordance with the invention, there is provided the following invention:

(1) a moldable composition of zeolite which comprises zeolite powder, a $\beta$-1,3-glucan, a 1:1 layer-type clay mineral and a 2:1 layer-type clay mineral;

(2) a molded article of zeolite which comprises zeolite powder, a $\beta$-1,3-glucan, a 1:1 layer-type clay mineral and a 2:1 layer-type clay mineral;

(3) a calcined molded article of zeolite which comprises zeolite powder, a 1:1 layer-type clay mineral and a 2:1 layer-type clay mineral;

(4) a method of producing a molded article of zeolite which comprises extrusion-molding the above mentioned moldable composition of zeolite; and (5) a method of producing a calcined article of zeolite which comprises calcining the above mentioned molded article of zeolite.

The moldable composition of zeolite of the invention comprises zeolite powder, a $\beta$-1,3-glucan, a 1:1 layer-type clay mineral and a 2:1 layer-type clay mineral, The composition of the invention usually contains a solvent such as water and is used as a kneaded solid-like composition (referred to as the kneaded solid composition hereinafter) so that it can be extrusion-molded. However, the composition of the invention may be a slurried composition or in other forms.

The moldable kneaded solid composition of zeolite of the invention is such a plastic or moldable solid, just like a water-containing clay, as contains a sufficient amount of water or an aqueous solution to render the solid plastic or moldable together with zeolite powder, a $\beta$-1,3-glucan, a 1:1 layer-type clay mineral and a 2:1 layer-type clay mineral. The molded article of zeolite may be obtained by plastic-molding of such a composition.

The powder of zeolite used in the invention may be a powder of natural zeolites or synthesized zeolites, or a mixture of two or more of the zeolites. The natural zeolite includes chabazites, mordenites, clinoptilolites and erionites. The synthesized zeolite includes, A-type (for example, Silton B (trademark) or Mizucasieves 4A (trademark) available from Mizusawa Industrial Chemicals, Ltd.), X-type (for example, Mizucasieves X (trademark) available from Mizusawa Industrial Chemicals, Ltd.), Y-type (for example, Mizucasieves Y (trademark) available from Mizusawa Industrial Chemicals, Ltd.), synthesized mordenites and high silica type (for example, MFI type). Zeolites of different ratios of Si/Al or of different structures, or zeolites formed of other elements may also be used.

The type of zeolite powder used may be selected adequately upon use. For instance, A- or X-type may be preferred for use as a drying agent, and high silica type (MFI type) for use as a nitrogen oxide decomposing catalyst. Any type of zeolites may be used as an adsorbent.

It is preferred that the zeolite powder used has a comparatively small particle size and an appropriate distribution, and in particular, it is preferred that the zeolite powder has an average particle size of not more than 10 $\mu$m. It is most preferred that the average particle size is not more than 5 $\mu$m.

The $\beta$-1,3-glucan used in the invention functions mainly as a plasticizer which renders zeolite powder plastic. The $\beta$-1,3-glucan is such a glucan as is mainly composed of $\beta$-1,3-glucoside linkages, and there may be used as such a $\beta$-1,3-glucan, for example, curdlan, laminarin, paramylon, callose or pachyman. Among these $\beta$-1,3-glucans, a $\beta$-1,3-glucan of microbial origin is preferred such as curdlan or paramylon, with the former being most preferred, since the use of a small amount of these microbial $\beta$-1,3-glucans provides a higher plasticity with the zeolite powder.

Curdlan is a polysaccharide which contains mainly $\beta$-1,3-glucoside linkages, and which is usually coagulated or gelled when heated in the presence of water. Namely, curdlan is thermogelable when heated in the presence of water, as described in New Food Industry, Vol. 20, No. 10, pp. 49–57 (1978).

Curdlan may be produced by Alcaligenes or Agrobacterium microorganisms, more specifically, by *Alcaligenes faecalis var myxogenes* 10C3K (Agricultural Biological Chemistry, Vol. 30, p. 196 (1966)), a mutant NTK-u (IFO 13140) of the above (Japanese Patent Publication no 48-32673), *Agrobacterium radiobacter* (IFO 13127) or its mutant (IFO 12126) (Japanese Patent Publication No. 48-32674).

Curdlan is a microbial polysaccharide as above, and it may be used as impurified state or highly purified.

Paramylon is also one of $\beta$-1,3-glucans and is a reserve polysaccharide which a microbe Euglena reserves in cells. It is already known as described in Carbohydrate Research, 25, 231–242 (1979) or Japanese Patent Application Laid-open No. 1-37297. Paramylon may be treated with an alkali so that it is thermogelable, if desired. Paramylon may also be used as impurified state or highly purified, with the same with the other $\beta$-1,3-glucans.

According to the invention, the thermogelable curdlan or alkali-treated paramylon is most preferred among the $\beta$-1,3-glucans. The use of thermogelable $\beta$-1,3-glucan a plasticizer provides a kneaded solid composition or a molded article of zeolite with a sufficient strength throughout the steps of molding, drying and calcining of zeolite.

The moldable composition of zeolite of the invention comprises such a $\beta$-1,3-glucan, singly or as a mixture of two or more, usually in an amount of 0.1–20 parts by weight, preferably in an amount of 0.5–10 parts by weight, in relation to 100 parts by weight of the zeolite powder used.

As above set forth, the $\beta$-1,3-glucan is used as a plasticizer to provide plasticity with a powder of zeolite which per se has no plasticity.

Further according to the invention, the composition comprises a 1:1 layer-type clay mineral or a 2:1 layer-type clay mineral as an inorganic sintering agent so that the resultant calcined article has a strength. The 1:1 layer-type clay mineral used includes kaolin minerals such as kaolinite, halloysite, dickite, lizardite, amesite, natural clay (such as Kibushi clay or Gairome clay), with kaolinite, halloysite or Kibushi clay being particularly preferred. These clay minerals may be used singly or as a mixture.

In turn, the 2:1 layer-type clay mineral used includes pyrophyllite minerals (such as pyrophyllite), smectite minerals (such as montmorillonite, bentonite, synthesized smectite or hectorite), vermiculite minerals (such as vermiculite). These clay minerals may also be used singly or as a mixture. Among these are preferred smectite minerals, and especially bentonite or synthesized smectite is most preferred.

The above described 1:1 layer-type and 2:1 layer-type clay minerals are used in the composition in a weight ratio ranging from 10/90 to 95/5, preferably 30/70 to 90/10, more preferably 55/45 to 85/15.

The 1:1 layer-type clay mineral is used as a sintering agent to increase mechanical strength of the resultant calcined article of zeolite. However, when the composition is extrusion-molded, the mineral molecules contained therein are forced to have layer orientation so that the mineral is apt to undergo interlayer slip. Thus, when the 1:1 layer-type clay mineral is used singly or in-excess, the resultant calcined article is apt to produce cracks along the layer orientation of molecules, and accordingly the calcined article has no satisfactory mechanical strength.

The 2:1 layer-type clay mineral is microcrystalline and rarely has a layer orientation. Accordingly the use of the 2:1 layer-type clay mineral in conjunction with an adequate amount of the 1:1 layer-type clay mineral corrects the defect of the 1:1 layer-type clay mineral as mentioned above. However, when the 2:1 layer-type clay mineral is used singly or in excess, the resultant composition has a reduced moldability, and hence is infeasibly used in extrusion molding. The resultant extrusion-molded article has neither flat surface nor sufficient strength.

The 1:1 and 2:1 layer-type clay minerals are used in the invention usually in a total amount of 5–50 parts by weight, preferably 10–45 parts by weight, in relation to 100 parts by weight of the zeolite used.

The moldable composition of zeolite of the invention, or a molded article or a calcined article produced therefrom may comprise reinforcement such as inorganic fibers which may be exemplified by, for example, glass fibers, carbon fibers, alumina fibers, silica fibers, alumina-silicate fibers, rock wool, zirconia fibers, silicon carbide fibers, titanium fibers, boron fibers, magnesia fibers, slag wool, asbestos or sepiolite. Among these fibers, glass fibers or sepiolite is preferred. The inorganic fibers may be used in an amount of 0.1–20 parts by weight, preferably 0.2–15 parts by weight, most preferably 0.5–10 parts by weight, in relation to 100 parts by weight of the zeolite used.

The composition as set forth thus far is molded, dried and calcined to provide a calcined article having a large strength. Especially the use of the inorganic fibers in the composition provides a calcined article of eminent mechanical strength.

In accordance with the invention, a molding aid may be jointly used to render the resultant composition more highly plastic or moldable. When such a composition is molded and dried, and if necessary calcined, it provides a molded article of an improved strength.

The molding aid may be a conventional one known in the technology of molding of zeolite powder, and such an aid is used according to the zeolite powder used or the requisites to calcined article of zeolite. Therefore, there may be used as such a molding aid, for example, cellulosic compounds, polyhydric compounds or polyvinyl compounds.

More specifically, the cellulosic compound includes methyl cellulose, ethyl cellulose, carboxymethyl cellulose, sodium carboxymethyl cellulose, hydroxyethyl cellulose, hydroxypropyl cellulose, hydroxypropylmethyl cellulose and hydroxyethylmethyl cellulose. These cellulosic compounds are available on the market. They may be used regardless of molecular weight, and selected adequately depending on use.

The polyhydric compound used includes, for example, glycerine; alkylene glycols such as ethylene glycol, propylene glycol, triethylene glycol or 1,3-butylene glycol; and polyoxyalkylene glycols such as polyethylene glycol or polypropylene glycol. These polyhydric compounds are also available on the market. They may be used regardless of molecular weight, and selected adequately depending on use.

The polyvinyl compound used includes, for example, polyvinyl alcohol, polyvinyl pyrrolidone, polyacrylic acid resins, polyacrylic acid salt resins, e.g., polyammonium acrylate, acrylic acid-maleic acid copolymers or their ammonium salts. The polyacrylic acid resin may be cross-linked. Such a cross-linked polyacrylic acid resin is already known and is available on the market. These polyvinyl compounds are also available on the market. They may be used regardless of molecular weight, and selected adequately depending on use.

a variety of organic materials may also be used as a molding aid in addition to the above. For example, carboxymethyl starch, sodium alginate or ammonium alginate may also be preferably used as a molding aid.

The molding aid may be used singly or as a mixture of two or more. The molding aid may be used usually in an amount (in a total amount when a mixture of two or more is used) of about 0.1-30 parts by weight, preferably about 0.2-15 parts by weight, in relation to 100 parts by weight of zeolite used.

As above set forth, a variety of materials may be used as a molding aid, however, methyl celulose derivatives such as methyl cellulose, hydroxypropylmethyl cellulose or hydroxyethylmethyl cellulose is preferred. More specifically, such a methyl cellulose derivative as forms a 2% aqueous solution of a viscosity of 20-100000 centipoises, preferably 400-100000 centipoises, at 20° C., is preferred.

According to the invention, the use of thermogelable $\beta$-1,3-glucan, in particular, curdlan, or alkali-treated paramylon, together with the methyl cellulose derivatives as above mentioned as a molding aid advantageously provides a highly moldable composition of zeolite. In addition, as set forth hereinafter, when a mold is formed, the thermogelable $\beta$-1,3-glucan therein is thermogelled, and the molded article is dried, there is obtained a molded article having a large strength without no cracks being generated thereon.

Further according to the invention, the use of polyethylene glycol as the polyhydric compound preferably of a molecular weight of about 6000 together with inorganic fibers, for example, glass fibers, and the above mentioned methyl cellulose derivatives as a molding aid provides a molded article of zeolite of an excellent strength, in particular, a honeycomb structure of zeolite.

If necessary, the moldable composition or the molded article produced therefrom may comprise an alkyl ether of polyethylene glycol, a surfactant as a wetting agent, or zinc stearate, aluminum stearate or magnesium stearate as a lubricant.

The moldable composition of zeolite comprises the ingredients as above set forth. There is no limitation to methods of producing such a composition including the kneaded solid composition as hereinbefore mentioned. By way of example, at first a $\beta$-1,3-glucan, and if necessary, together with a molding aid and/or a sintering agent, all as powder, are added to zeolite powder, to prepare a mixture. Alternatively, a solution or dispersion of a $\beta$-1,3-glucan, and if necessary, together with a molding aid in a small amount of water or a water soluble organic solvent such as methanol or ethanol, is added to zeolite powder, to prepare a mixture. Thereafter, the mixture is fully admixed so that the $\beta$-1,3-glucan, molding aid and sintering agent are dispersed uniformly throughout the mixture. Then an appropriate amount of water or an aqueous solution is added to the mixture and fully kneaded, thereby to provide a kneaded and moldable solid composition of zeolite. A $\beta$-1,3-glucan, molding aid and sintering agent may be added separately and admixed with zeolite powder.

The aqueous solution used above is a mixture of water and a water soluble organic solvent such as methanol or ethanol. The amount of the organic solvent in the solution is not specifically limited. However, the use of water is preferred to the use of the solution in the above production of the composition.

The thus prepared kneaded solid composition of zeolite may be extrusion-molded to a green mold of desired shape, dried at temperatures in the range of room temperatures to 110° C., and then if necessary, calcined, to provide a molded article or a calcined article of zeolite of the invention. The calcination is carried out at temperatures usually in the range of 500°-800° C., preferably 550°-700° C.

The molded article or a calcined article of zeolite of the invention may be of any shape, and for example, it may be of the shape of granules, spheres, rods having a round or square section, pipes or tubes, thin plates, sheets, films, or honeycombs. The use of kneaded solid composition of the invention readily provides a molded article or a calcined article having a complex shape like a honeycomb structure.

It is preferred according to the invention that after the preparation of a green mold of water-containing solid composition of zeolite, the mold is first heated in the presence of water to curdle or coagulate the thergelable $\beta$-1,3-glucan, and then the mold is dried. In general, the gelation of the thermogelable $\beta$-1,3-glucan may be carried out by heating the green mold while preventing the spontaneous evaporation of water contained in the mold, if necessary in the presence of additional water. More specifically, the green mold may be heated with microwave, or heated in a closed vessel or under saturated steam.

The temperature at which the β-1,3-glucan is curdled may depend upon the individual β-1,3-glucan used, however, it is usually in the range of 70°–150° C. The heating time is usually in the range of 0.5–12 hours.

In this way, when the thermogelable β-1,3-glucan contained in the green mold is first curdled, the mold is strengthened, and no crack is produced while the mold is dried. After the gelation of the thermogelable β-1,3-glucan, the green mold may be dried in a conventional manner. For example, the mold may be placed under a high temperature, dried with hot air or dried at a low temperature.

In general, the alkali metal ions in zeolites may be readily exachanged with other metal ions. The alkali metal ions in the molded article and the calcined article of zeolite of the invention may also readily undergo the same ion exchange as in the normal zeolites as above.

In order to exchange the alkali metal ions in the molded article or calcined article, for example, a calcined honeycomb structure, of the invention with other metal ions, the article is put into contact with an aqueous solution (a saturated solution or a solution of concentrations of 0.001–10M, preferably of 0.001–5M) of a nitrate, sulfate, chloride or acetate of such a metal ion at room temperatures over a period of 2–72 hours, preferably 5–48 hours, more preferably 10–30 hours. The molded article and calcined article of the invention has such a suficient strength that it can be treated as above with no cracks being generated thereon.

The alkali metal ions in the molded article and the calcined article of zeolite of the invention may be exchanged with such a metal ion as, for instance, magnesium, calcium, manganese, iron, cobalt, nickel, copper or zinc ions. These ions may be exchanged singly or as a mixture with the alkali metal ions in the molded article or the calcined article of zeolite of the invention. The molded article or calcined article of which alkali metal ions have thus been exchanged with other metal ions are useful in various uses.

For instance, a high silica type zeolite having sodium ions as alkali metal ions there in is formed to a calcined article according to the invention, and then the calcined article is treated so that the sodium ions are exchanged with copper and/or cobalt, to provide a catalyst which decomposes reductively nitrogen oxides (NO) to nitrogen and oxygen. When the ion-exchanged amount as defined by $\{2M^{2+}/(2M^{2+}+Na^+)\}$ is not less than 50% (i.e., in the range of 50–100%) as the metal ions with which the sodium ions have been exchanged are taken as $M^{2+}$, the resultant catalyst has an especially high catalytic activity.

In the NO removal from a stationary NO generating source (cogeneration and the like), there has been used an NO selective reduction process on a catalyst system of $V_2O_5$-$TiO_2$-W(Mo)$O_3$. As well known, this process uses dangerous and expensive ammonia. In contrast, the use of calcined article of zeolite which contains ion-exchanged copper or cobalt ions there in needs no ammonia for NO removal since the article itself has a decomposing activity.

As a further example, a Y-type zeolite containing sodium ions as alkali metal ions therein is formed to a calcined article according to the invention, and then the calcined article is treated so that the sodium ions are exchanged with at least one selected from iron, nickel and copper ions, to provide a catalyst which oxidatively decomposes sulfur compounds such as hydrogen sulfide or mercaptans.

The above mentioned ion-exchanged molded or calcined article of zeolite may also be prepared by use of zeolite powder which has been in advance ion-exchanged. Namely, such a zeolite is formed to a composition, molded and then calcined.

A calcined article is so adapted that a granule of 1.0 mm in diameter and 1.0 mm in length has a squeezing strength of not less than 5.0 Kg, preferably 5.0–20 Kg, more preferably 5.2–10 Kg, as measured with use of Model 1310D measuring apparatus available from Aiko Engineering K.K., as hereinafter set forth in examples of the invention. A calcined article containing in organic fibers is so adapted that a rod having a round section and a diameter of 8 mm has a three point bending strength (according to JIS) of not less than 5.0 MPa, preferably not less than 5.3 MPa and not more than 100 MPa.

It is preferred that a calcined article in the form of honeycomb has a large opening rate so that a liquid or a gas passes through the honeycomb under contact therewith with substantially no resistance (i.e., with only a small pressure loss), and hence it is useful as an adsorbent or a catalyst. The opening rate may be usually in the range of 50–90%, preferably 50–85%, more preferably 55–80%.

The moldable composition or molded article of zeolite of the invention may further comprise other additives in addition to the hereinbefore mentioned zeolite, β-1,3-glucan, 1:1 layer-type clay mineral and 2:1 layer-type clay mineral. Thus, the moldable composition or molded article of zeolite of the invention may comprise inorganic fibers or molding aids, or both.

The calcined article of zeolite of the invention may similarly contain other additives in addition to zeolite, 1:1 layer-type clay mineral and 2:1 layer-type clay mineral. Thus, the calcined article of zeolite of the invention may comprise inorganic fibers or metal ions received by ion-exchange process.

The invention thus provides a molded article and a calcined article of zeolite, and in particular, the invention is advantageous over the prior art in the provision of a molded article and a calcined article of zeolite in the form of honeycomb structure.

Industrial Exploitation

As above set forth, the composition of zeolite of the invention has a high plasticity or moldability, and for example, it may be readily extrusion-molded to a green mold of a desired shape. The green mold is dried, and if necessary calcined, to provide a molded article or a calcined article having a large strength and high dimensional accuracy.

In particular, the use of the thermogelable β-1,3-glucan provides a sufficient strength with a molded article and calcined article through the steps of molding, drying and calcining of zeolite.

Further according to the invention, the use of the moldable composition of zeolite readily provides a molded article of zeolite of complicated structure such as a honeycomb structure by extrusion molding of the composition, although the production of honeycomb structure of zeolite has been difficult according to prior art. In contrast, the calcining of such a molded article readily provides a calcined honeycomb structure of zeolite.

The molded or calcined article may be suitably used as a dehydrating and drying agent for cracked gas, natural gas or hexafluorosulfur, an adsorbent for nitrogen in PSA method oxygen generating apparatus, an adsorbent for carbon dioxide or water in air separation apparatus, an adsorbent for carbon dioxide or water in combustion gas, a dehydrating agent for refrigerants in refrigerators, car coolers or air conditioners, an agent for moisture from layered glass, a drying agent for air brake devices, a drying agent for solvents, a catalyst for decomposing nitrogen oxides emitted from automobiles or cogeneration plants, an adsorbent for carbon dioxide gas fixation, or a catalyst for fluorocarbon gases and the like.

The honeycomb structure of zeolite of the invention is prepared using a moldable composition of zeolite which contains a small amount of $\beta$-1,3-glucan as a molding aid and other aids, and accordingly the calcining of a molded article results in a slight reduction of strength, or the resultant calcined article has a large strength.

Moreover, it is easy to place a fixed amount of the honeycomb structure of the invention in an adsorption tube. No wear takes place between the particles of zeolite, and pressure loss of liquid is small when the liquid is passed therethrough. Therefore, the honeycomb structure of the invention is suitable for use as a drying agent or a catalyst, or a carrier material therefor.

The invention will now be described with reference to examples, however, the invention is not limited thereto. The production and purification of curdlan will also be given below as a reference example.

REFERENCE EXAMPLE

According to the method described in Japanese Patent Publication No. 48-32673, a culture broth was treated with an alkali, centrifuged, and neutralized with an acid, to provide a solution of curdlan. The solution was desalted, concentrated, spray-dried and concentrated, to provide curdlan.

EXAMPLE 1

An amount of 700 g (solid) of A-type synthesized zeolite powder (Silton B (trademark) available from Mizusawa Industrial Chemicals, Ltd., 4A-type) was admixed with 50 g (solid) of bentonite powder (Benclay (trademark) available from Mizusawa Industrial Chemicals, Ltd.) and 250 g (solid) of halloysite powder, both as sintering agents, and then with 12.5 g of curdlan (available from Takeda Chemical Industries, Ltd.) and 37.5 g of hydroxypropylmethyl cellulose (a 2% by weight aqueous solution of which had a viscosity of about 28000 centipoises at 20° C.). The mixture was dry-mixed for one hour with a twin screw desk kneader.

Distilled water was added to the mixture so that the mixture contained water in a total amount of 550 g, and the mixture was kneaded under a reduced pressure (about 100–700 mmHg) with a kneader provided with a jacket therearoud for about one hour while cold water at temperature of 10° C. was fed to the jacket to cool the kneaded mixture.

The resultant kneaded mixture was placed in a polyethylene envelope and aged at a temperature of room temperature to 40° C. for about three to five days. Then the mixture was kneaded with an extruder (Model DE-35 available from Honda Tekkosha) under a reduced pressure to provide a kneaded solid composition of zeolite.

The composition was then extruded to a green mold of honeycomb structure having an outer diameter of 30 mm and a cell number of 160 per square inch with an extruder provided with honeycomb molding dies.

The green mold was cut to a length of 20 cm, placed in a closed vessel, and heated in a drying oven at 115° C. for about two hours to gel the curdlan. Then the mold was taken out of the vessel and dried at 115° C. in an oven overnight. The mold was then placed in an electric oven and calcined at 700° C. for two hours to provide a calcined article of honeycomb structure of zeolite having an opening rate of 55%.

The moldability of the kneaded solid composition of zeolite was studied. The calcined article of honeycomb structures was also checked whether cracks were found thereon by amanner below. The results are summarized in Table 1.

The calcined article of honeycomb structures were checked whether cracks were found thereon by a method below. A honeycomb mold was calcined at 700° C. in an electric oven for two hours, taken out of the oven, and then placed on $\alpha$-alumina powder at room temperatures under the atmosphere for 24 hours to cool the article naturally. Thereafter the article was checked with the eye to determine whether cracks were generated thereon on account of moisture absorption.

EXAMPLE 2

An amount of 200 g of paramylon powder was dissolved in 20 liters of a 1N aqueous solution of sodium hydroxide under stirring. A 4N aqueous solution of hydrochloric acid was added to the solution to adjust the pH at 6.0, to precipitate a $\beta$-1,3-glucan. The thus neutralized slurry was centrifuged (8000 rpm × 10 minutes) and concentrated, and then 20 liters of water were added to the concentrate again to a slurry.

The slurry was centrifuged and concentrated in the same manner as above to provide 5 Kg of a paste. The paste was frozen to −20° C. Ethanol of a volume twice the paste was added thereto, and then frozen, followed by filtlation under vacuum, to provide 800 g of a dehydrated matter. The matter was vacuum dried at 60° C. to provide about 180 g of powder of thermogelable paramylon.

An amount of 12.5 g of the above mentioned paramylon was used in place of curdlan and otherwise in the same manner as in Example 1, a calcined article of honeycomb structure was prepared having an opening rate of 55%.

The moldability of the kneaded solid composition of zeolite was studied. The calcined article of honeycomb structures was also checked determine whether cracks were found thereon. The results are summarized in Table 1.

EXAMPLE 3

A kneaded solid composition was prepared in the same manner as in Example 1, and the composition was extruded to a green plate having a thickness of 3 mm and a width of 30 mm with an extruder provided with plate molding dies.

The green mold was cut to a length of 50 mm, placed in a closed vessel, and heated in a drying oven at 115° C. for one hour to gel the curdlan. Then the mold was taken out of the vessel and dried at 115° C. in an oven for 12 hours. The mold was then placed in an electric oven and calcined at 700° C. for two hours to provide a calcined plate of zeolite.

The moldability of the kneaded solid composition of zeolite was studied. The calcined plate was also checked determine whether cracks were found thereon. The results are summarized in Table 1.

EXAMPLE 4-10

As indicated in Tables 1 and 2, kneaded solid compositions of zeolite were prepared using various zeolite powders, $\beta$-1,3-glucans, molding aids and sintering agents, The compositions were then formed to calcined articles of honeycomb structure having an opening rate of 55%.

The moldability of the kneaded solid compositions of zeolite was studied. The calcined articles of honeycomb structures were also checked to determine whether cracks were found thereon. The results are summarized in Table 1.

EXAMPLE 11

This example is given for comparison of the properties of the calcined articles of honeycomb structure of the invention with those of conventional spherical zeolites.

Squeezing Strength

The same kneaded solid composition as in Example 4 was prepared in the same manner as in Example 1. The composition was molded and calcined in the same manner as in Example 1 to provide a couple of calcined honeycomb structures. One of them had a diameter of 8 mm, a cell number of 300 per square inch and an opening rate of 63%, and the other a diameter of 30 mm, a cell number of 300 per square inch and an opening rate of 63%.

These calcined articles of honeycomb structure were subjected to measurement of squeezing strength at a loading rate of 10 mm per minute with a use of desk load measuring apparatus (Model 1310D available from Aiko Engineering K.K.).

The calcined article of honeycomb structure having a diameter of 8 mm had a squeezing strength of 3.47 Kg (average of 10 measurements), and the calcined article having a diameter of 30 mm had a squeezing strength of 11.20 Kg (average of 5 measurements).

Water Adsorption Power after drying at 250° C. for three hours, the water adsorption power of the calcined articles of honeycomb structure were measured at 20° C. according to JIB K 1464. The results are indicated in Table 2.

TABLE 2

| Time (hr) | Relative Humidity (%) | Water Adsorption Power (%) |
|---|---|---|
| 24 | 5 | 5.42 |
|  | 20 | 14.18 |
|  | 50 | 16.95 |
|  | 75 | 18.18 |
|  | 90 | 20.39 |
| 48 | 5 | 10.68 |
|  | 20 | 15.89 |
|  | 50 | 17.02 |
|  | 75 | 18.21 |
|  | 90 | 20.46 |
| 120 | 5 | 14.72 |
|  | 20 | 16.00 |
|  | 50 | 17.07 |
|  | 75 | 18.42 |
|  | 90 | 21.07 |
| 168 | 5 | 14.64 |
|  | 20 | 15.94 |
|  | 50 | 17.18 |
|  | 75 | 18.46 |
|  | 90 | 20.79 |

TABLE 1

| Example | Zeolite Powder | | Sintering Agent | | Plasticizer | | Molding Aid | | Moldability | Calcined Article |
|---|---|---|---|---|---|---|---|---|---|---|
| 1 | A-Type | (70) | Bentonite<br>Halloysite | (5)<br>(25) | Curdlan | (1.25) | HPMC | (3.75) | Excellent | No Crack |
| 2 | A-Type | (70) | Bentonite<br>Halloysite | (5)<br>(25) | Paramylon | (1.25) | HPMC | (3.75) | Excellent | No Crack |
| 3 | A-Type | (70) | Bentonite<br>Halloysite | (5)<br>(25) | Curdlan | (1.25) | HPMC | (3.75) | Excellent | No Crack |
| 4 | A-Type | (70) | Bentonite<br>Kibushi Clay | (5)<br>(25) | Curdlan | (1.25) | HPMC | (3.75) | Excellent | No Crack |
| 5 | A-Type | (70) | Synthesized Smectite<br>Kibushi Clay | (5)<br>(25) | Curdlan | (1.25) | HPMC | (3.75) | Excellent | No Crack |
| 6 | A-Type | (70) | Synthesized Smectite<br>Halloysite | (5)<br>(25) | Curdlan | (1.25) | HPMC | (3.75) | Excellent | No Crack |
| 7 | A-Type | (70) | Bentonite<br>Kibushi Clay | (5)<br>(25) | Curdlan | (5) | — |  | Good | No Crack |
| 8 | High silica type | (70) | Bentonite<br>Kibuski Clay | (5)<br>(25) | Curdlan | (1.25) | HPMC | (3.75) | Excellent | No Crack |
| 9 | Na-X type | (70) | Bentonite<br>Halloysite | (5)<br>(25) | Curdlan | (1.25) | Methyl Cellulose | (3.75) | Excellent | No Crack |
| 10 | Na-Y type | (70) | Bentonite<br>Halloysite | (5)<br>(25) | Curdlan | (1.25) | Methyl Cellulose | (3.75) | Excellent | No Crack |
| Comparative | A-Type | (70) | Bentonite<br>Halloysite | (5)<br>(25) | None |  | HPMC | (5) | Bad | — |

Notes:
Benclay (trademark) was used as bentonite, available from Mizusawa Industrial Chemicals, Ltd.
Ionite (trademark) was used as synthesized smectite, available from Mizusawa Industrial Chemicals, Ltd.
HPMC represents hydroxypropylmethyl cellulose known as Metolose (trademark) 90SH30000, available from Shin-etsu Kagaku Kogyo K.K.
Metolose (trademark) SM8000 was used as methyl cellulose, available from Shin-etsu Kagaku Kogyo K.K.
The numericals in the parentheses are parts by weight in solid. In the sintering agent, the upper indicates a 2:1 layer-type clay mineral, and the lower indicates a 1:1 layer-type clay mineral.
The numericals in the parentheses are parts by weight in solid. In the sintering agent, the upper indicates a 2:1 structure clay mineral, and the lower indicates a 1:1 structure clay mineral.

Wear Resistance

The calcined article of honeycomb structure having a diameter of 8 mm and a length of 35 mm as obtained above was placed in a copper pipe having a length of 70 mm, and then both the openings of the pipe were sealed with a porous film. The pipe was fixed in a 100 ml capacity bottle containing 60 ml of n-hexane, the bottle was mounted on a planetary ball mill, and then turned for two hours under the conditions of pot revolving speed of 570 rpm and disc revolving speed of 265 rpm, to test wear resistance of the calcined article of honeycomb structure.

For the purpose of comparison, zeolite spheres (A4) of 4/6 meshes were used in place of the calcined article of honeycomb structure, and otherwise in the same manner as above, a test for wear resitance of zeolite spheres was effected.

After the test, the sample was dried at 115° C. and the degree of wear was calculated based on the decrease in weight. The degree of wear of the calcined article of honeycomb structure was 0% whereas that of the zeolite spheres was 1.9%.

As a further measurement, the turbidity of the n-hexane was measured in terms of transmittance at a wavelength of 600 nm. The n-hexane used in the test of calcined article of honeycomb structure had a transmittance of 98.6% whereas the n-hexane used in the test of zeolite spheres had a tranmittance of 82.4%. This result illustrates that the calcined article of honeycomb structure has an excellent wear resistance.

Dehydration of Acetone

Calcined articles of honeycomb structure having a diameter of 30 mm were dried at 180° C. for two hours, and an amount of 11.87 g of the calcined articles were placed in a column having a diameter of 31 mm, a length of 30 mm and a capacity of 22.6 ml. An amount of 200 ml of acetone (Special Reagent Grade available from Wako Junyaku Kogyo K.K.) was circulatingly passed through the column downwardly at a rate of 90 ml per hour (at an SV of 4.0 liters per hour and at an LV of 11.9 m per hour) over a period of 6 hours. The water content in the acetone was measured at a regular interval by Karl Fischer's method to determine the water adsorption rate and adsorption power. The results are indicated in Table 3.

In the above-mentioned determination, 17.35 g of zeolite spheres (4A) of 4/6 meshes were used in place of the calcined article of honeycomb structure, and otherwise in the same manner as above, water adsorption rate and adsorption power were determined. The results are indicated in Table 3.

TABLE 3

| | Honeycomb | Zeolite Spheres |
|---|---|---|
| Charged Amount (g) | 11.87 | 17.35 |
| Charged Density (g/cc) | 0.53 | 0.77 |
| Adsorption Rate (g-H$_2$O/hr) | 0.109 | 0.113 |
| Water Adsorption Capacity Based On Weight (g-H$_2$O/g)*) | 0.021 | 0.017 |
| Water Adsorption Capacity Based On Volume (g-H$_2$O/cc)*) | 0.011 | 0.013 |

Notes: *)Water adsorption power per unit weight of honeycomb or spherical zeolites It will be readily understood that the calcined article of honeycomb structure of zeolite of the invention has a larger water adsorption power per weight.

EXAMPLE 12

An amount of 800 g (solid) of A-type synthesized zeolite powder (available from Mizusawa Industrial Chemicals, Ltd., 3A-type) was admixed with 200 g of inorganic binders (in a total when two binders were used) as shown in Table 5, and then with 12.5 g of curdlan and 37.5 g of methyl cellulose (a 2% by weight aqueous solution of which had a viscosity of about 28000 centipoises at 20° C.). The mixture was dry-mixed for one hour with a twin screw desk kneader.

Distilled water was added to the mixture so that the mixture contained water in a total amount of 550 g, and the mixture was kneaded under a reduced pressure (about 100–700 mmHg) with a kneader provided with a jacket therearoud for about one hour while cold water at temperature of 10° C. was fed to the jacket to cool the kneaded mixture.

The resultant kneaded mixture was placed in a polyethylene envelope and aged at a temperature of room temperature to 40° C. for about three to five days. Then the mixture was kneaded with an extruder (Model DE-35 available from Honda Tekkosha) under a reduced pressure to provide a kneaded solid composition of zeolite.

The resultant composition of zeolite was extruded to a molded article having a diameter of 1.0 mm with a flow tester (available from K.K. Shimadzu Seisakusho). The extruded mold was dried at 150° C. for three hours, and then crushed to granules having a diameter of 1.0 mm and a length of 1.0 mm. The granules were then calcined at 550° C. for two hours.

The calcined granules were subjected to measurement of squeezing strength at a loading rate of 10 mm per minute with a use of desk load measuring apparatus (Model 1310D available from Aiko Engineering K.K.). The results are indicated in Table 4 wherein the value of squeezing strength is an average of ten measurements.

TABLE 4

| Inorganic Sintering Agent*) | Squeezing Strength (Kg) |
|---|---|
| Invention | |
| Halloysite/Bentonite (15/5) | 6.0 |
| Kibushi Clay/Bentonite (15/5) | 5.2 |
| Hard Clay/Bentonite (15/5) | 5.2 |
| Comparative | |
| Halloysite | 4.6 |
| Kibushi Clay | 3.4 |
| Hard Clay | 2.8 |

Notes: *)The ratios in the parentheses are weight ratios of 1:1 structure clay mineral/2:1 structure clay mineral. Bentonite used is Benclay (trademark) from Mizusawa Industrial Chemicals, Ltd.

EXAMPLE 13

An amount of 700 g (solid) of A-type synthesized zeolite powder (Silton B (trademark) available from Mizusawa Industrial Chemicals, Ltd., 4A-type) was admixed with 50 g (solid) of bentonite powder (Benclay (trademark) available from Mizusawa Industrial Chemicals, Ltd. ) and 200 g (solid) of Kibushi clay, both as sintering agents, and 50 g of glass fibers (Microglas Chopped Strand RES015 (trademark) available from Japan Sheet Glass), and then with 12.5 g of curdlan (available from Takeda Chemical Industries, Ltd.) and 37.5 g of methyl cellulose (Metolose (trademark) SM800 0 available from Shin-etsu Kagaku Kogyo K.K.). The mixture was dry-mixed for one hour with a twin screw desk kneader Distilled water was added to the mixture so that the mixture contained water in a total amount of 550 g, and the mixture was kneaded under a reduced pressure (about 100–700 mmHg) with a kneader provided with a jacket therearound for about one hour while cold water at temperature of 10° C. was fed to the jacket to cool the kneaded mixture.

The resultant kneaded mixture was placed in a polyethylene envelope and aged at a temperature of room temperature to 40° C. for about three to five days. Then the mixture was kneaded with an extruder (Model DE-35 available from Honda Tekkosha) under a reduced pressure to provide a kneaded solid composition of zeolite.

The composition was then extruded to a green mold of honeycomb structure having an outer diameter of 30 mm and a cell number of 160 per square inch with an extruder provided with honeycomb molding dies.

The green mold was cut to a length of 20 cm, placed in a closed vessel, and heated in a drying oven at 115° C. for about two hours to gel the curdlan. Then the mold was taken out of the vessel and dried at 115° C. in an oven overnight. The mold was then placed in an electric oven and calcined at 700° C. for two hours to provide a calcined article of honeycomb structure of zeolite having an opening rate of 55%.

The calcined article of honeycomb structure was checked to determine whether cracks were found thereon in the same manner as in Example 1. No cracks were found on the calcined article of honeycomb structure.

EXAMPLE 14

Glass fibers (Microglas Surfastrand (trademark) REV8) were used as inorganic fibers, and the otherwise in the same manner as in Example 13, a calcined article of honeycomb structure of zeolite having an opening rate of 55% was prepared. There were no cracks found thereon.

EXAMPLE 15

An amount of 700 g of the same A-type synthesized zeolite powder as before was admixed with 50 g of the same bentonite powder and 250 g of Kibushi clay as before, and then with 12.5 g of curdlan and 37.5 g of methyl cellulose. The mixture was dry-mixed for one hour with a twin screw desk kneader, and was then treated in the same manner as in Example 13 to provide a kneaded solid composition of zeolite.

The resultant composition was extruded to a rod having a round section and a diameter of 8 mm with an extruder provided with rod molding dies. The rod was cut to a length of 5 cm and calcined in the same manner as in Example 13 to provide a calcined rod of zeolite.

The calcined rod was checked to determine whether or not cracks were found thereon in the same manner as in Example 1. No cracks were found.

EXAMPLE 16

The same kneaded solid composition of zeolite containing glass fibers as in Example 13 was molded into a rod having a round section and a diameter of 8 mm in the same manner as in Example 15. The rod was cut to a length of 5 cm and calcined in the same manner as in Example 13 to provide a calcined rod of zeolite having a round section.

The calcined rod was checked to determine whether or not cracks were found thereon in the same manner as in Example 1. No cracks were found.

EXAMPLE 17

The same kneaded solid composition of zeolite containing glass fibers as in Example 14 was molded into a rod having a round section and a diameter of 8 mm in the same manner as in Example 15. The rod was cut to a length of 5 cm and calcined in the same manner as in Example 13 to provide a calcined rod of zeolite.

The calcined rod was checked to determine whether or not cracks were found thereon in the same manner as in Example 1. No cracks were found.

EXAMPLES 18-20

Every groups of ten calcined rods obtained in Examples 15-17 were left standing at room temperatures for 48 hours under the atmosphere so that the rods absorbed moisture sufficiently, and then the rods were subjected to measurement of three point bending strength with a span of 30 mm and at a cross head speed of 0.5 mm per minute with a strength measuring apparatus (Autograph Model AG-1000A available from K.K. Shimadzu Seisakusho). As an average value of ten times measurement, the rods of Examples 15, 16 and 17 had strengths of 5.3 MPa, 10.9 MPa and 9.4 MPa, respectively.

As will be apparent from the above results, there is obtained a calcined article of zeolite having an improved strength by using a kneaded solid composition contaning a small amount of inorganic fibers.

EXAMPLE 21

An amount of 700 g (solid) of high silica type zeolite powder having a silica/alumina molar ratio of 27 was mixed with 50 g (solid) of the same bentonite powder, 200 g (solid) of Kibushi clay, 50 g of glass fibers (Microglas Chopped Strand RES015 (trademark) available from Japan Sheet Glass K.K.), 12.5 g of curdlan, 31.3 g of methyl cellulose and 6.2 g of polyethylene glycol (Macrogol (trademark) 6000 available from Sanyo Kasei Kogyo K.K.).

The resultant mixture was treated in the same manner as in Example 13 to provide a green mold of honeycomb structure having a diameter of 30 mm and a cell number of 300 per square inch. The molded aericle was cut to a length of 5 cm and calcined in the same manner as in Example 13 to provide a calcined article of honeycomb structure having an opening rate of 63%.

EXAMPLE 22

A high silica type zeolite powder having a silica/alumina molar ratio of 45 was used and the otherwise in the same manner as in Example 21, there was obtained a calcined article of honeycomb structure having an opening rate of 63%.

EXAMPLE 23

An amount of 7.25 g of copper nitrate trihydrate was dissolved in 300 ml of distilled water in a 500 ml capacity glass beaker to prepare an aqueous solution containing 0.03 moles of copper ions.

The calcined article of honeycomb structure having a length of 5 cm as obtained in Example 21 was immersed in the solution at room temperatures for 24 hours under stirring. Thereafter, a 25% aqueous ammonia solution was added to the solution to arrange the pH at 8, followed by stirring for another two hours. The honeycomb structure was taken out of the solution, fully washed with distilled water, and dried at 115° C. for 8 hours, thereby to provide a pale blue calcined article of honeycomb structure of which sodium ions had been exchanged with copper ions.

EXAMPLE 24

The calcined article of honeycomb structure as obtained in Example 22 was treated in the same manner as in Example 23 to provide a pale blue calcined article of honeycomb structure of which sodium ions had been exchanged with copper ions.

EXAMPLE 25

The calcined articles of honeycomb structure obtained in Examples 23 and 24 were each charged in a fixed bed reaction tube. The tube was heated to 300° C., 400° C. or 500° C. under helium, and then a mixed gas composed of 1000 ppm of nitrogen monoxide and helium was passed therethrough at a space velocity of 40000 hr$^{-1}$ under normal pressures. The concentrations of nitrogen and nitrogen monoxide were measured both at the inlet and outlet of the reaction tube with a gas chromatography (Model GC-14A available from K.K. Shimadzu Seisakusho).

The activity for decomposing nitrogen monoxide after minutes from the start of the reaction is indicated in Table 5. The activity for decomposing nitrogen monoxide is defined by {2(nitrogen concentration at outlet/nitrogen monoxide concentration at inlet)}×100 (%).

TABLE 5

| Reaction Temperature (°C.) | Activity for Nitrogen Monoxide Decomposition (%) Calcined Article of Honeycomb Structure of | |
|---|---|---|
| | Example 23 | Example 24 |
| 300 | 30 | 33 |
| 400 | 45 | 51 |
| 500 | 42 | 50 |

As indicated above, the calcined article of honeycomb structure of zeolite has a high activity for NO decomposition over a wide range of temperatures.

We claim:

1. A moldable composition of zeolite which comprises:
   (a) zeolite powder;
   (b) a β-1,3-glucan in an amount of 0.1–20 parts by weight in relation to 100 parts by weight of the zeolite powder; and
   (c) a 1:1 layer clay mineral and a 2:1 layer clay mineral in a total amount of 5–50 parts by weight in relation to 100 parts by weight of the zeolite powder.

2. The composition as claimed in claim 1 which is in the form of a kneaded solid.

3. The composition as claimed in claim 1 wherein the weight ratio of 1:1 layer clay mineral to 2:1 layer clay mineral is in the range of 10/90 to 95/5.

4. The composition as claimed in claim 1 which further comprises inorganic fibers in an amount of 0.1–20 parts by weight in relation to 100 parts by weight of the zeolite powder.

5. A molded article of zeolite which comprises:
   (a) a zeolite;
   (b) a β-1,3-glucan in an amount of 0.1–20 parts by weight in relation to 100 parts by weight of the zeolite; and
   (c) a 1:1 layer clay mineral and a 2:1 layer clay mineral in a total amount of 5–50 parts by weight in relation to 100 parts by weight of the zeolite.

6. The molded article of zeolite as claimed in claim 5 wherein the weight ratio of 1:1 layer clay mineral to 2:1 layer clay mineral is in the range of 10/90 to 95/5.

7. The molded article of zeolite as claimed in claim 5 or 6 which further comprises inorganic fibers in an amount of 0.1–20 parts by weight in relation to 100 parts by weight of the zeolite.

8. The molded article of zeolite as claimed in claim 5 or 6 which is in the form of honeycomb.

9. The composition as claimed in claim 1 in which the 1:1 layer clay mineral is kaolin mineral.

10. The composition as claimed in claim 1 in which the 2:1 layer clay mineral is selected from the group consisting of pyrophyllite mineral, smectite mineral and vermiculite mineral.

11. The composition as claimed in claim 2 wherein the weight ratio of 1:1 layer clay mineral to 2:1 layer clay mineral is in the range of 10/90 to 95/5.

12. The composition as claimed in claim 2 which further comprises inorganic fibers in an amount of 0.1–20 parts by weight in relation to 100 parts by weight of the zeolite.

13. The composition as claimed in claim 3 which further comprises inorganic fibers in an amount of 0.1–20 parts by weight in relation to 100 parts by weight of the zeolite.

14. A method of producing a molded article of zeolite which comprises extrusion-molding the moldable composition as claimed in claim 2.

15. A method of producing a calcined article of zeolite which comprises calcining the molded article of zeolite as claimed in claim 5.

16. A method of producing a calcined article of zeolite which comprises heating the molded article of zeolite as claimed in claim 5 in the presence of water, and thereafter calcining the article.

17. A calcined article of zeolite produced by calcining a molded article of zeolite comprising:
   (a) a zeolite;
   (b) a β 1,3-glucan in an amount of 0.1–20 parts by weight in relation to 100 parts by weight of the zeolite; and
   (c) a 1:1 layer clay mineral and a 2:1 layer clay mineral in a total amount of 5–50 parts by weight in relation to 100 parts by weight of the zeolite.

18. The calcined article of zeolite of claim 7 wherein the weight ratio of 1:1 layer clay mineral to 2:1 layer clay mineral is in the range of 10:90 to 95:5.

19. The calcined article of zeolite of claim 17, which further comprises inorganic fibers in an amount of 0.1–20 parts by weight in relation to 100 parts by weight of the zeolite.

20. The calcined article of zeolite of claim 17 which is in the form of a honeycomb structure.

21. A catalyst comprising:
   (i) a molded article of zeolite which comprises:
      (a) a zeolite;
      (b) a β 1,3-glucan in an amount of 0.1–20 parts by weight in relation to 100 parts by weight of the zeolite; and
      (c) a 1:1 layer-type clay mineral and a 2:1 layer clay mineral in a total amount of 5–50 parts by weight in relation to 100 parts by weight of the zeolite; and
   (ii) at least one metal selected from the group consisting of magnesium, calcium, manganese, iron, cobalt, nickel, copper, and zinc; wherein the metal is supported on the molded article of zeolite.

22. The catalyst of claim 21 wherein the metal is copper.

23. A catalyst which comprises a calcined article of zeolite and at least one metal selected from the group consisting of magnesium, calcium, manganese, iron, cobalt, nickel, copper and zinc; wherein the catalyst is produced by:

calcining a molded article of zeolite which comprises:
(a) a zeolite
(b) a $\beta$-1,3-glucan in an amount of 0.1–20 parts by weight in relation to 100 parts by weight of the zeolite; and
(c) a 1:1 layer clay mineral and a 2:1 layer clay mineral in a total amount of 5–50 parts by weight in relation to 100 parts by weight of the zeolite to form a calcined article of zeolite;

then supporting the metal on the calcined article of zeolite.

24. The catalyst of claim 23 wherein the metal is copper.

25. The catalyst as claimed in claim 23 which is in the form of a honeycomb.

* * * * *